United States Patent
Appleton et al.

(10) Patent No.: US 12,205,608 B2
(45) Date of Patent: Jan. 21, 2025

(54) WIDEBAND ADAPTATION OF ECHO PATH CHANGES IN AN ACOUSTIC ECHO CANCELLER

(71) Applicant: Dolby Laboratories Licensing Corporation, San Francisco, CA (US)

(72) Inventors: Nicholas Luke Appleton, Rosebery (AU); Jenean Jiaying Lee, Artarmon (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 303 days.

(21) Appl. No.: 17/905,860

(22) PCT Filed: Mar. 17, 2021

(86) PCT No.: PCT/US2021/022755
§ 371 (c)(1),
(2) Date: Sep. 8, 2022

(87) PCT Pub. No.: WO2021/188665
PCT Pub. Date: Sep. 23, 2021

(65) Prior Publication Data
US 2023/0137830 A1    May 4, 2023

Related U.S. Application Data

(60) Provisional application No. 63/148,632, filed on Feb. 12, 2021, provisional application No. 62/991,028, filed on Mar. 17, 2020.

(51) Int. Cl.
*G10L 21/02* (2013.01)
*G10L 21/0232* (2013.01)
(Continued)

(52) U.S. Cl.
CPC ...... *G10L 21/0232* (2013.01); *G10L 21/0264* (2013.01); *G10L 2021/02082* (2013.01); *G10L 21/0316* (2013.01)

(58) Field of Classification Search
CPC ...... G10L 21/0316; G10L 2021/02082; H04M 9/082; H04B 3/237; H04B 3/234
See application file for complete search history.

(56) References Cited

U.S. PATENT DOCUMENTS 7,508,931 B2 * 3/2009 Johnston ............... H04B 3/234
                                                              379/406.08
7,817,797 B2 * 10/2010 Popovic ................ H04B 3/237
                                                              379/406.01
(Continued)

FOREIGN PATENT DOCUMENTS

WO    WO-2007083349 A1 *  7/2007  ............ H04B 3/234

OTHER PUBLICATIONS

Akhtar, Muhammad Tahir "On Reducing Effect of Acoustic Feedback in Hearing Aids By Employing Lattice Prediction and Hybrid Adaptive Filtering" IEEE 10th Annual Information Technology, Electronics and Mobile Communication Conference, Oct. 17-19, 2019.

(Continued)

*Primary Examiner* — Feng-Tzer Tzeng (57) ABSTRACT

Systems, methods, and computer program products for echo cancellation with prediction filter adaptation and detection of wideband offset between a reference signal (available to the echo canceller) and an output signal (unavailable to the echo canceller), where the output signal has been generated by applying at least one level shift to the reference signal, e.g. such that the level shift is unknown to the echo canceller.

19 Claims, 3 Drawing Sheets

(51) Int. Cl.
    *G10L 21/0264*     (2013.01)
    *G10L 21/0208*     (2013.01)
    *G10L 21/0316*     (2013.01)

(56) References Cited

U.S. PATENT DOCUMENTS

| | | | |
|---|---|---|---|
| 8,817,970 | B2 | 8/2014 | Petyushko |
| 9,361,901 | B2 | 6/2016 | Leblanc |
| 10,446,169 | B1 | 10/2019 | Kamdar |
| 2002/0076037 | A1* | 6/2002 | Nishimura ............ H04M 9/082 379/406.01 |
| 2007/0280472 | A1* | 12/2007 | Stokes, III ............. H04S 7/305 379/406.01 |
| 2008/0192946 | A1* | 8/2008 | Faller ................... H04M 9/082 381/66 |
| 2011/0019833 | A1 | 1/2011 | Kuech |
| 2012/0250872 | A1* | 10/2012 | LeBlanc ............... H04M 9/082 381/71.1 |
| 2014/0064476 | A1 | 3/2014 | Mani |
| 2014/0254813 | A1 | 9/2014 | Anderton |
| 2019/0035414 | A1 | 1/2019 | Christoph |
| 2019/0115040 | A1* | 4/2019 | Kamdar ............. G10L 21/0232 |
| 2019/0156852 | A1* | 5/2019 | Shi ........................ H04R 3/04 |

OTHER PUBLICATIONS

Wang, Sheng-Sian, et al "Compensation of SNR Degradation Caused by Nonlinearity of the Phase Interpolator in a Frequency-Domain Echo Canceller" IEEE International Symposium on Circuits and Systems, May 27-30, 2018.

* cited by examiner

WIDEBAND ADAPTATION OF ECHO PATH CHANGES IN AN ACOUSTIC ECHO CANCELLER

CROSS-REFERENCE TO RELATED APPLICATIONS

This application claims the benefit of U.S. Provisional Patent Application No. 63/148,632, filed Feb. 12, 2021, and U.S. Provisional Patent Application No. 62/991,028, filed Mar. 17, 2020, both of which are incorporated herein by reference in their entirety.

FIELD OF INVENTION

This disclosure generally relates to audio signal processing (e.g., echo cancellation on an audio signal). Some embodiments pertain to echo cancellation with prediction filter adaptation and detection of offset between a reference signal (available to the echo canceller) and an output signal (unavailable to the echo canceller), where the output signal has been generated (e.g., for provision to a loudspeaker) by applying a level shift to the reference signal.

BACKGROUND

Herein we use the expression "echo cancellation" to denote suppression, cancelling, or other management of echo content of an audio signal.

Many commercially important audio signal processing applications (e.g., duplex communication and room noise compensation for consumer devices) benefit from echo cancellation. Echo management is a key aspect in any audio signal processing technology which requires duplex playback and capture, including voice communications technologies as well as consumer playback devices which have voice assistants.

Typical implementation of echo cancellation includes adaptation or one or more prediction filters. The prediction filter(s) take as input a reference signal, and output a set of values that is as close as possible to (i.e., has minimal distance from) the corresponding values observed in a microphone signal. The prediction is typically done using either: a single filter that operates (or a set of M filters that operate) on time domain samples of a frame of the reference signal; or one or more filters, each operating on data values of a frequency domain representation of a frame of the reference signal.

When the prediction is done on frequency domain data with a set of M prediction filters, the length of each of these filters is only 1/M of the length of the single time domain filter needed to capture the same range of delay. During adaptation, coefficients of the prediction filter(s) are typically adjusted by an adaptation mechanism to minimize the distance between the output of the prediction filter(s) (applied to the reference signal) and the input. A number of adaptation mechanisms are well known in the art (e.g., LMS (least mean squares), NLMS (normalized least mean squares), and PNLMS (proportionate normalized least mean squares) adaptation mechanisms are conventional).

As noted, an echo cancellation system may operate in the time domain, on time-domain input signals. Implementing such systems may be highly complex, especially where long time-domain correlation filters are used, for many audio samples (e.g., tens of thousands of audio samples), and may not produce good results.

Alternatively, an echo cancellation system may operate in the frequency domain, on a frequency transform representation of each time-domain input signal (i.e., rather than operating in the time-domain). Such systems may operate on a set of complex-valued band-pass representations of each input signal (which may be obtained by applying a STFT or other complex-valued uniformly-modulated filterbank to each input signal). For example, US Patent Application Publication No. 2019/0156852, published May 23, 2019, describes echo management (echo cancellation or echo suppression) which includes frequency domain adaptation of a set of prediction filters.

Notation and Nomenclature

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements echo cancellation may be referred to as an echo cancellation system, and a system including such a subsystem may also be referred to as an echo cancellation system.

Throughout this disclosure including in the claims, the term "processor" is used in a broad sense to denote a system or device programmable or otherwise configurable (e.g., with software or firmware) to perform operations on data (e.g., audio data). Examples of processors include a field-programmable gate array (or other configurable integrated circuit or chip set), a digital signal processor programmed and/or otherwise configured to perform pipelined processing on audio data, a graphics processing unit (GPU) configured to perform processing on audio data, a programmable general purpose processor or computer, and a programmable microprocessor chip or chip set.

Throughout this disclosure including in the claims, the term "couples" or "coupled" is used to mean either a direct or indirect connection. Thus, if a first device is said to be coupled to a second device, that connection may be through a direct connection, or through an indirect connection via other devices and connections.

Throughout this disclosure including in the claims, "audio data" denotes data indicative of sound (e.g., speech) captured by at least one microphone, or data generated (e.g., synthesized) so that said data are renderable for playback (by at least one speaker) as sound (e.g., speech). For example, audio data may be generated so as to be useful as a substitute for data indicative of sound (e.g., speech) captured by at least one microphone.

SUMMARY

In some systems which require the use of an acoustic echo canceller (e.g., a communications system or a consumer device with a voice assistant), there may be external changes to the echo path (e.g., a playback level change implemented using a volume control) about which the echo canceller (typically implemented by one or more processors programmed to execute audio processing code) cannot know in a synchronous manner with the audio. When these external changes occur, the echo canceller needs to re-adapt which may take a significant amount of time. Typical embodiments of the invention use a reference audio signal (indicative of audio content for playback, but not indicative of any such external change to the echo path) and a microphone signal (from which predicted echo is to be removed) to detect wideband level changes (due to external changes to the echo path) such that the echo canceller can make a fast transition to a new level target.

Some embodiments pertain to performing echo cancellation with prediction filter adaptation and detection of a wideband offset between a reference signal (available to the echo canceller) and an output signal (unavailable to the echo canceller), where the output signal has been generated by applying a level shift to the reference signal.

In a class of embodiments, the inventive method is an echo cancellation method performed on a reference signal indicative of audio content for playback by a speaker and an input signal from a microphone, contemporaneously with provision of an output signal to the speaker. The method includes:

receiving, by an echo canceller, the input signal;
receiving, using at least one prediction filter of the echo canceller, the reference signal, where the output signal has been generated by applying to the reference signal at least one level shift (e.g., such that the at least one level shift is unknown to the echo canceller);
predicting, by the echo canceller, echo content of the input signal which would result from sound emission by the speaker in response to the reference signal, thereby determining predicted echo content of the input signal;
in response to the input signal and the predicted echo content, detecting a wideband offset between the reference signal and the output signal; and
removing from the input signal at least some of the predicted echo content.

Typical embodiments are applicable to capture processing technologies (e.g., to a device capable of both playing back audio, via a speaker of the device, and capturing audio, via a microphone of the device) which operate in a scenario where total control of the audio input and output is not available to the technologies. For example, some embodiments are useful where a capture processing system (for implementing echo cancellation) is integrated with or into a communications system, where the communications system may cause changes in the echo path which are unknown to the capture processing system (unless and until such changes are detected in accordance with an embodiment of the invention).

Aspects of the invention include a system configured (e.g., programmed) to perform any embodiment of the inventive method or steps thereof, and a tangible, non-transitory, computer readable medium (for example, a disc or other tangible storage medium) which stores (implements non-transitory storage of) code for performing (e.g., code executable to perform) any embodiment of the inventive method or steps thereof.

DETAILED DESCRIPTION

Some embodiments of the invention pertain to echo cancellation (e.g., by a device). Echo cancellation by a device (capable of both playing back audio via a speaker of the device and capturing audio via a microphone of the device) is typically intended to enable the device to remove playback content, which is being played from the speaker, from the signal captured by the microphone. Under normal circumstances when the device is playing back content, the level of the playback content in the microphone output signal (which playback content is referred to as "echo") is greater (e.g., orders of magnitude greater) than the level of other content (e.g., utterances of a person speaking at a small distance from the device) in the microphone output signal. This makes it important to remove the playback content from the microphone output signal to the extent possible.

Echo cancellers attempt to predict the audio captured by the microphone from the audio which is being sent to the speakers, and then remove (subtract) the predicted audio from the microphone output signal. The best method for implementing such prediction may be different for different use-cases. A popular method for implementing echo cancellers is using gradient descent techniques to optimize a filter which maps speaker signals to the microphone signal in a way that attempts to minimize the error between them. These algorithms have a trade-off between echo cancellation performance (i.e., limits to how much of the echo can be removed) and filter adaptation time. Some embodiments of the invention are enhancements to conventional gradient descent adaptation techniques, which may provide a way to quickly migrate an echo canceller's prediction in the event of a wideband level change in the speaker signal (e.g., a level change which could occur due to operation of a volume control or analog gain control). One such use-case is on a system where gains could be applied to the speaker feed signal that are not known to the echo cancellation system.

Figures 1, 3:
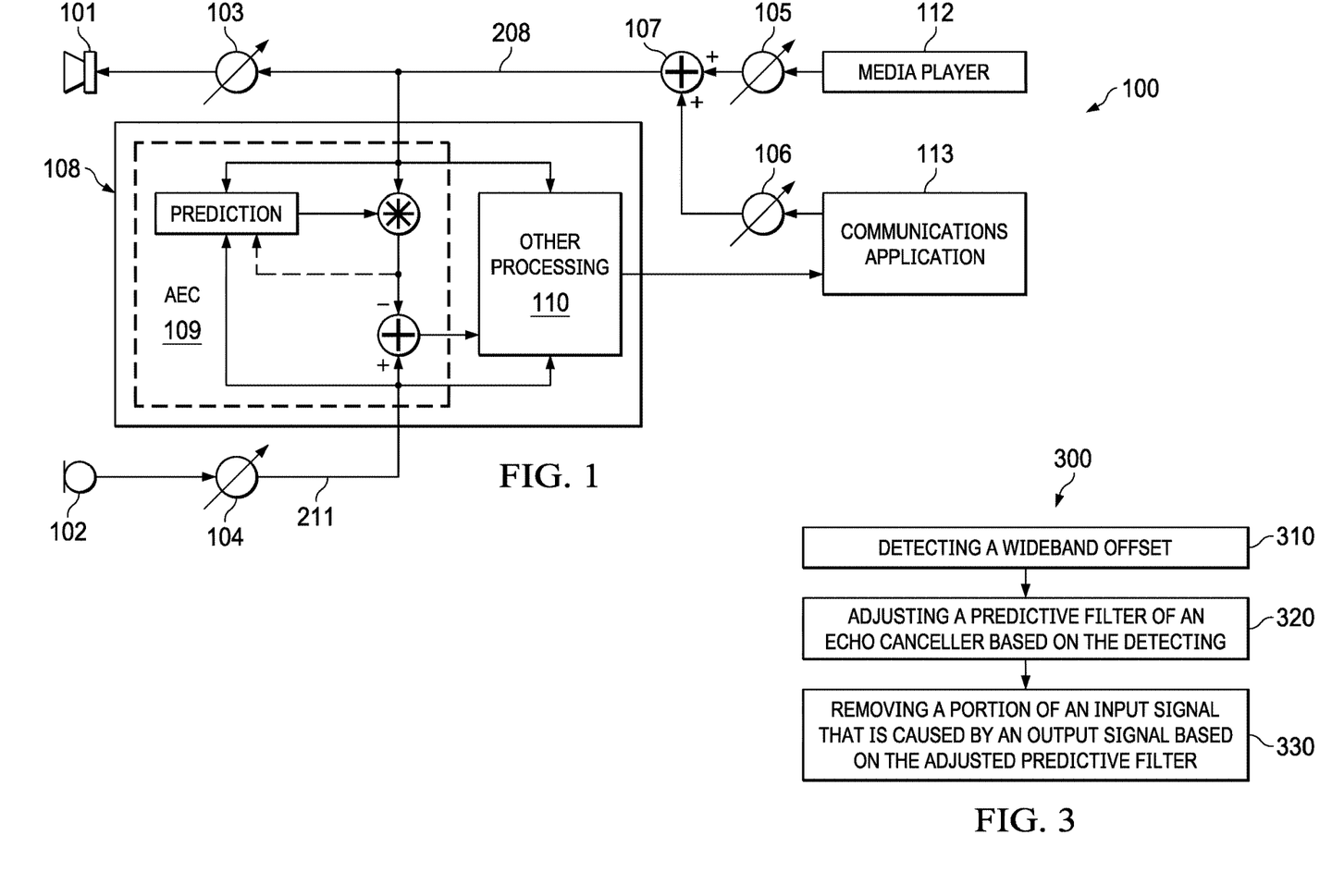
FIG. 1 is a block diagram of an echo cancellation system (which may implement an embodiment of the invention) integrated into a communications system.
FIG. 3 is a flowchart of an example process wideband adaptation of path changes.

FIG. 1 is a block diagram of an echo cancellation system (which may implement an embodiment of the invention) integrated into a communications system. Communications system 100 of FIG. 1 may be a communication device including a processing subsystem (at least one processor which is programmed or otherwise configured to implement communication application 113 and audio processing subsystem 108), and physical device hardware (including loudspeaker 101 and microphone 102) coupled to the processing subsystem. Typically, system 100 includes a non-transitory computer-readable medium which stores instructions that, when executed by the at least one processor, cause said at least one processor to perform an embodiment of the inventive method.

Audio processing subsystem 108 (e.g., implemented as an audio processing object) is implemented (i.e., at least one processor is programmed to execute subsystem 108) to perform an embodiment of the inventive echo cancellation method (in echo cancellation subsystem 109) in response to playback audio stream 208 and microphone audio stream 211. Playback audio stream 208 is an audio signal (sometimes referred to herein as "reference signal" 208) provided (via gain element 103) to loudspeaker 101. Microphone audio stream 211 is an audio signal (sometimes referred to herein as "microphone signal" 211) output from gain element 104 in response to the output of microphone 102. Subsystem 108 is also implemented (i.e., it includes audio processing subsystem 110 which is implemented) to perform other audio processing on the echo-managed audio output from echo cancellation subsystem 109. Although subsystem 110 may be a voice processing subsystem, it is contemplated that in some implementations, subsystem 110 performs audio processing (e.g., preprocessing for communication application 113 or another audio application) which is not voice processing.

The audio output of subsystem 108 is provided to communication application 113. Subsystem 108 may be implemented as a software plugin that interacts with audio data present in system 100's processing subsystem.

Echo cancellation subsystem 109 (implemented by subsystem 108) does not have (and is unable to have) knowledge of gains that have been applied by gain element 104 to the output signal of microphone 102, and by gain element 103 to reference signal 208 (to generate the speaker feed provided to speaker 101). Echo cancellation subsystem 109 is sometimes referred to herein as an echo cancellation system. The sources of playback content (e.g., media player 112 and communications application 113) to be played by speaker 101 typically have their own independent gain elements (e.g., gain elements 105 and 106, respectively) which apply variable gains to the inputs of system mixer 107 (whose output is reference signal 208), but these pose no problem to the echo cancellation implemented by echo cancellation system 109 as their changes are visible to echo cancellation system 109. Ideally, the gains applied by elements 103 and 104 are fixed and unable to change (during echo cancellation), but not all integrations of echo cancellation technologies can support such a solution.

When there is a level change at element 103 or 104 (sometimes referred to herein as an "echo path change" or "path change"), this will cause the predicted echo signal (the negated input to the adder block of system 109) to be incorrect and will lead to echo being present in the echo-managed output of echo cancellation system 109. The echo burst will last for as long as it takes for the prediction subsystem (of system 109) to stabilize again. In some implementations of FIG. 1 (or other systems/integrations), there may be a signal that is available to the echo cancellation system (system 109 of FIG. 1) that informs it that a level has changed which is not synchronous with the audio data on which echo cancellation is to be performed. This would permit the echo cancellation system to take action to suppress the excess echo at the output while the prediction re-adapts, but is also not an ideal solution.

One example where a level change at element 103 can be particularly problematic is where the FIG. 1 system (e.g., implemented in or as a device) includes a voice assistant which upon hearing its wake word (e.g., "Ok Google", "Alexa", or "Hey Cortana"), reduces the playback volume of the device using the output gain element 103. This would cause echo level issues at exactly the point where the system is trying to hear a command uttered by the person who spoke the wake word. At the point that the audio level is reduced by element 103, the echo in the output of the echo cancellation system could be even louder than while the wake word itself was being spoken. This necessitates fast adaptation of the echo cancellation which compromises the echo level reduction. Typical embodiments of the invention address such problems of conventional systems.

Figure 2:
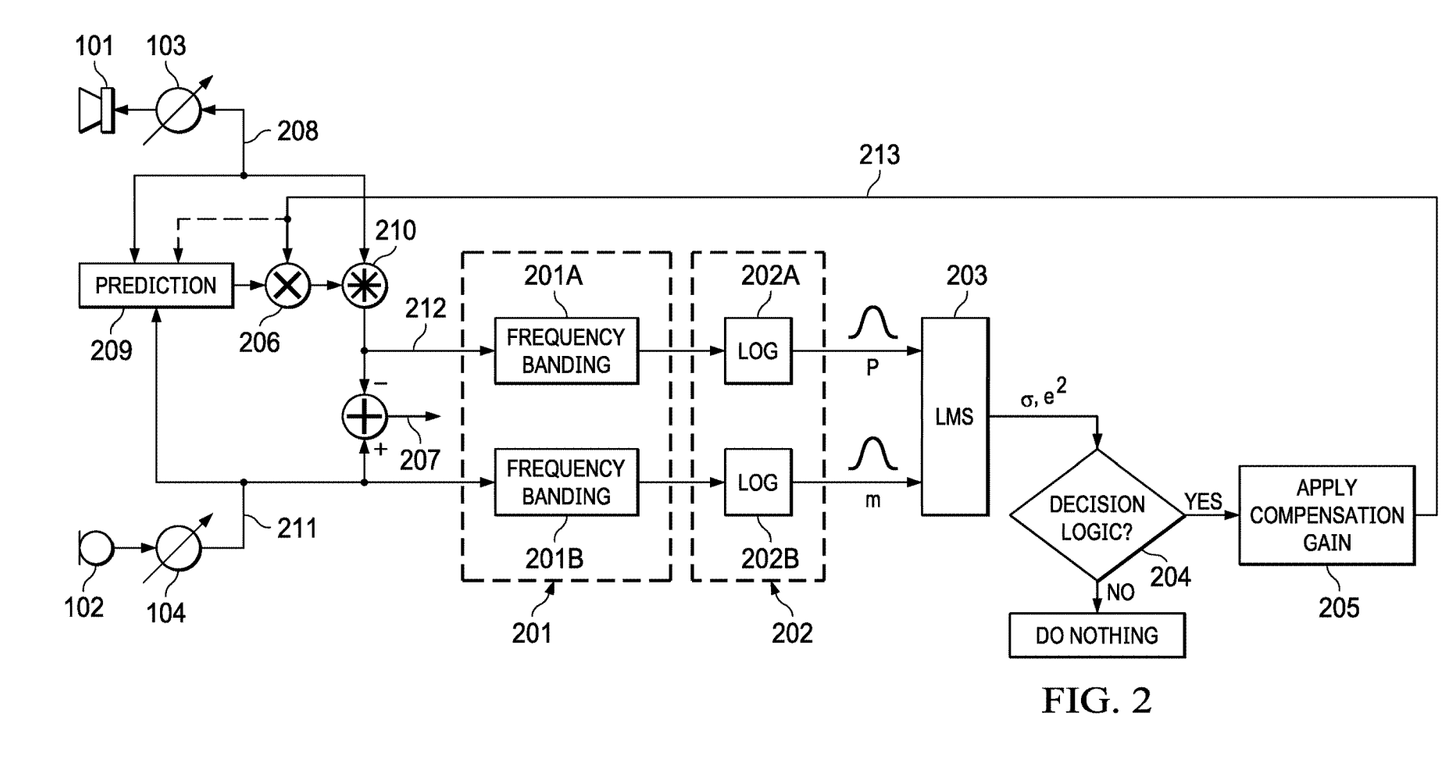
FIG. 2 is a block diagram of elements of an echo cancellation system configured to perform wideband adaptation of path changes in accordance with an embodiment of the invention.

FIG. 2 is a block diagram of an example system which implements an example embodiment of the inventive method of adaptation in response to wideband echo cancellation path changes. The elements of the FIG. 2 system include speaker 101, microphone 102, and gain elements 103 and 104 (corresponding to identically numbered elements 101, 202, 103, and 104 of FIG. 1), signals 208 and 211 (corresponding to identically numbered signals of FIG. 1), and echo cancellation system elements (including elements 201, 202, 203, 204, 205, 206, 209, and 210). The echo cancellation system elements shown in FIG. 2 are elements of an echo cancellation subsystem (which implements an example embodiment of the invention, which is an improved version of and a replacement for echo cancellation system 109 of FIG. 1) of the FIG. 2 system. Embodiments of the inventive echo cancellation system may include additional elements not shown in FIG. 2.

With reference to FIG. 2, when a gain change is applied at element 103 or 104 (an example of an "echo path change" or "path change"), the echo path change will appear as a wideband level change in microphone signal 211. However, the reference audio signal 208 that the echo cancellation system receives (and is thus "aware" of) will remain unchanged. Herein, a "wideband" level (or level change) of a signal denotes a level (or level change) of or over at least one frequency band comprising frequency bins, e.g., over all or some bins of a full set of frequency bins, of a frequency-domain representation of the signal. Similarly, a "wideband" offset (or "wideband" level offset) between a first signal (e.g., a reference signal) and a second signal (e.g., an output signal) is an offset between a wideband level of the first signal and a corresponding wideband level of the second signal.

As mentioned before, an uncorrected echo path change may result in an incorrect predicted echo signal (in FIG. 2, the predicted echo signal is labeled as signal 212) which may cause a loud echo burst in the output signal 207 of the echo cancellation system, potentially obscuring important audio in the microphone signal that is required for the correct functioning of other systems. To detect an echo path change, the FIG. 2 embodiment implements a comparison of the spectra of the microphone signal 211 and predicted echo signal 212. Each of signals 211 and 212 is banded (in banding subsystem 201) into frequency bands, and the resulting banded spectra are converted into log-spaced log-power banded spectra (in subsystem 202). The resulting log power spectra of signals 211 and 212 (for each of the bands) are output from subsystem 202. Subsystem 201 includes element 201A (which is coupled and configured to operate on signal 212) and element 201B (which is coupled and configured to operate on signal 211). Subsystem 202 includes element 202A (which is coupled and configured to operate on the output of element 201A, and element 202B (which is coupled and configured to operate on the output of element 201).

Data values indicative of all bands of the log power spectra for signal 211 (for each time, in a sequence of different times) are sometimes referred to (collectively) herein as microphone signal, m. Data values indicative of all bands of the log power spectra for signal 212 (for each time, in the sequence of different times) are sometimes referred to (collectively) herein as predicted signal, p.

In a situation where there is no one speaking and only the playback content undergoes a level change (implemented by gain element 103), microphone signal, m, and predicted signal, p, will have similar shapes (plotted, for each of a sequence of times, as a function of frequency) with only a level offset between them from the moment the level change occurs. Offset determining subsystem 203 determines a level offset between microphone signal, m, and predicted signal, p, for each time. Each level offset may be an optimum level offset, as determined by an adaptation process which attempts to minimize a least mean squares (LMS) error between microphone signal, m, and predicted signal, p, or an LMS error over only a specific region of bandwidth of microphone signal, m, and predicted signal, p (e.g., to account for the speaker 101 being unable to produce particular frequencies or cover up problematic noise components of the microphone signal m). Subsystem 203 outputs (to decision logic 204) data indicative of the amount of error (e.g., a minimized squared error) between, and the determined offset between, the microphone signal, m, and the predicted signal, p.

In some implementations, subsystem 203 determines a minimized squared error, $e^2$, between the microphone signal, m, and predicted signal, p, including by determining the sum (over N of the frequency bands, where each of the bands is identified by a different value of index b) of the squares of the difference between each frequency band $m_b$ of the microphone signal, m, and the corresponding frequency band $p_b$ of the predicted signal, p, plus a possible (candidate) level offset, $\sigma$, in a frame of the audio. This error, $e^2$, is indicated in the following set of equations. To determine the minimized error $e^2$ (at one time), where the minimization is over candidate values of level offset, $\sigma$, the derivative ($de^2/d\sigma$) of the error $e^2$ with respect to $\sigma$ is determined, and set to zero. The resulting value of level offset $\sigma$ is the optimal level offset (which minimizes the error), and the minimized error $e^2$ is the value of error $e^2$ for the optimal level offset. The error ($e^2$), derivative ($de^2/d\sigma$), and optimal level offset (which is a sum of difference values, ($m_b-p_b$), over all N values of index b, divided by the number N), are as indicated in the following set of equations:

$$e^2 = \sum_b^N (m_b - p_b + \sigma)^2$$
$$= \sum_b^N \sigma^2 + \sum_b^N (m_b - p_b)^2 + \sum_b^N 2\sigma(m_b - p_b)$$
$$= N\sigma^2 + \sum_b^N (m_b - p_b)^2 + 2\sigma \sum_b^N (m_b - p_b)$$
$$\frac{de^2}{d\sigma} = 2N\sigma + 2\sum_b^N (m_b - p_b)$$
$$= 0$$
$$\sigma = \frac{\sum_b^N (m_b - p_b)}{N}$$

In the set of equations in the previous paragraph, the optimal level offset, $\sigma$, is indicated by the last equation (i.e., it is the sum of difference values, ($m_b-p_b$), over all N values of index b, divided by the number, N, of bands). The minimized error $e^2$ is the value of error $e^2$ (expressed in the set of equations as a function of $\sigma$) with the variable $\sigma$ equal to the optimal level offset. When subsystem 203 generates a single level offset value $\sigma$ for each time, N is the total number of bands in the full set of bands determined by subsystem 201. When subsystem 203 generates a plurality of level offset values $\sigma$ (e.g., one for each subset of bands of a full set of bands) for each time, the number N of bands (in the summation which determines one of such level offset values) is the number of bands of the relevant subset of the full set of bands.

In an ideal situation with no one speaking during the echo cancellation process, a gain change (by gain element 103) in playback volume or a gain change (by gain element 104) typically results in a large change in magnitude of optimal level offset $\sigma$, and a small minimized error, $e^2$. However, a gain change (by at least one of gain element 103 or 104) will not always have such a result, e.g., it may not have such a result when the microphone signal, m, is indicative of speech or other noise captured by the microphone. Thus, decision logic 204 is implemented to determine if the values of optimal level offset $\sigma$ and minimized error $e^2$ qualify to indicate a gain change by gain element 103 and/or gain element 104. Typically, when subsystem 203 generates more than one optimal offset value $\sigma$ (e.g., one for each band of a full set of bands) for each time, logic 204 determines whether the decision criterion (or criteria) for at least one such optimal offset value is (or are) met.

If the decision criterion (or criteria) applied by logic 204 is (or are) met for an optimal level offset, the optimal level offset, $\sigma$, corresponds to (and determines) an amount of gain necessary to "correct" the coefficients of a prediction filter (determined in prediction filter adaptation subsystem 209). In this case, compensation gain subsystem 205 determines compensation gain 213 which is then applied (at element 206) to the prediction filter coefficients 214 output (for all bands) from element 209. At element 206, each filter coefficient of the prediction filter is multiplied by the corresponding compensation gain value (provided from subsystem 205 to element 206), thus determining corrected prediction filter coefficients 214A which are applied (at convolution element 210) to filter the reference signal 208 to produce the predicted echo signal 212. Corrected coefficients 214A are also provided to subsystem 209 for use (during adaptation) to generate an updated set of coefficients 214. The predicted echo signal values 212 are subtracted from corresponding values of the microphone signal 211 to produce the echo cancelled output 207.

In some implementations of the FIG. 2 embodiment, the compensation gain value 213 is applied (e.g., in subsystem 206) to candidate prediction filter coefficients during prediction filter adaptation (e.g., gradient descent adaptation). During such adaptation, the compensation gain value 213 may also be applied (e.g., in subsystem 209) to at least one predicted echo value to generate a corrected predicted echo value which is used to determine an updated set of candidate prediction filter coefficients 214 (e.g., in a manner to be described in more detail below).

Typically, one compensation gain value 213 is determined (for any one time), and applied to all coefficients of a prediction filter.

In the FIG. 2 embodiment, one compensation value 213 may be multiplied (at element 206) with the filter coefficients 214 to generate corrected filter coefficients 214A which are input to convolution element 210. Optionally also, the compensation value 213 is applied (in subsystem 209) to predicted echo value(s) (generated during prediction filter adaptation) to improve updating of at least one set of candidate prediction filter coefficients during the prediction filter adaptation (e.g., in a manner to be described below in more detail).

In the FIG. 2 embodiment, all elements (e.g., 103, 104, 209, 206, and 210) to the left of banding subsystem 201 typically operate on each individual frequency bin of data. Thus, adaptation subsystem 209 determines filter coefficients 214 for every frequency bin, the compensation value 213 may be a scalar value which is multiplied with the filter coefficients in every frequency bin (determining corrected, e.g., adjusted or scaled, filter coefficients 214A), and element 210 implements convolution of the corrected filter coefficients 214A and the reference audio signal 208. All elements to the right of banding subsystem 201 operate on frequency bands of data. Subsystem 201 power bands the frequency-domain data provided thereto (for the individual bins) into data for a smaller number of real bands. The processing and analysis implemented by elements 202, 203, 204, and 205 are performed on the data in these bands. Typically, element 205 generates a single compensation gain value 213 (for each time) for correcting filter coefficients in all the bands (and thus for all the bins included therein). Element 205 may generate the value 213 to be a unity gain, if logic 204 determines that the filter coefficients should not be scaled by some non-unity amount.

Application of the compensation gain value(s) 213 (at element 206) to determine the corrected prediction filter coefficients 214A may quickly adapt the echo cancellation to compensate for a gain change at gain element 103 and/or gain element 104. This short adaptation time means that the echo cancellation performance is greatly improved for any signal that occurs immediately following the gain change, assuming the adaptation rate (e.g., gradient descent adaptation rate) implemented in adaptation subsystem 209 (to update each set of prediction filter coefficients) of the echo canceller is relatively slower.

It is contemplated that criteria of varying complexity may be applied by decision logic 204 in different implementations (e.g., depending on the intended use case of each implementation) in order to decide whether the prediction filter state should be adapted based on the optimal level offset $\sigma$ and minimized error $e^2$. If the microphone signal m and predicted signal p (the banded spectra which are output from subsystem 202) have similar shape (as a function of frequency, at one time) with only a level offset between them, then whether minimized error $e^2$ has a sufficiently small value may be an adequate decision criterion (i.e., logic 204 may cause subsystem 205 to generate non-unity gain(s) 213 if the minimized error exceeds a threshold). However, use of such a simple criterion may not accurately detect all gain changes at gain element 103 and/or gain element 104.

For example, the inventive system typically operates in an environment (e.g., a room), with the microphone capturing noise present in the environment. It is possible that a gain change at gain element 103 and/or 104 could reduce some levels of the microphone output signal to the noise floor which would result in a change in the spectrum shape of the microphone signal values m and/or predicted signal values p. This may be addressed by implementing subsystem 204 to attempt to detect a noise floor of the microphone signal using (as an example) a minimum follower. The resulting information may be used by subsystem 205 to output unitary gain for one or more bands (when subsystem 204 indicates to subsystem 205 that gain correction should not be applied for each such band, so that element 206 will not change the filter coefficients in the bins included in each such band) if subsystem 204 detects that these band(s) of the microphone signal are in noise (i.e., have level(s) which are in the noise floor) when subsystem 203 computes the level offset and the error for the band(s).

In another example embodiment, subsystem 204 is implemented to simply observe the value of each level offset $\sigma$ (a single offset determined by element 203 for all the bands, or each offset of a set of offsets determined by element 203, each for each different band) to see if it shifts substantially in one direction, and indicate to subsystem 205 whether non-unity gain correction should be applied (for all bands, or for individual bands). Typically, a single level offset $\sigma$ is determined (for all bands). In one preferred embodiment, subsystem 204 detects only whether a single level offset $\sigma$ (determined by element 203 for all bands) indicates that the gain 103 (and thus the level of device speaker 101's output) has dropped below a threshold, since it is not necessary to implement fast prediction filter correction if the gain 103 (and thus the output level of speaker 101) increases. This embodiment of subsystem 204 does not detect whether offset $\sigma$ indicates that the output level of speaker 101 has increased above any threshold. Thus, in accordance with the preferred embodiment, element 206 applies non-unity gain 213 to cancellation filter coefficients 214 (to correct the coefficients) only when the level of speaker 101 (as indicated by the level offset a) drops below the threshold. For example, in some implementations of the preferred embodiment, the threshold is equal to −5 dB.

During adaptation of a prediction filter (in subsystem 209), an error term $e^2[t]$ having the following form is typically computed:

$$e^2[t]=(m[t]-p[t])^2$$

where m[t] is microphone audio stream 211, and p[t] is a predicted signal determined by applying a set (e.g., a candidate set) of prediction filter coefficients to the reference signal 208. Subsystem 209 typically applies gradient descent to minimize the squared error term $e^2[t]$ during an adaptation for a time t, thereby determining a best set of prediction filter coefficients (resulting from the adaptation for time t). The adapted filter coefficients (and each set of candidate filter coefficients generated during the adaptation) are output from subsystem 209 to element 206. The gradient descent adaptation process typically includes determination of quantities $\partial e^2[t]/\partial a[n]$, which are the partial derivatives of the squared error $e^2[t]$ at time t with respect to each of the candidate filter coefficients, a[n] at time t. Each such partial derivative has the form:

$$\frac{\partial e^2[t]}{\partial a[n]} = 2r[t-n](p[t]-m[t]) = -2r[t-n]e[t]$$

where "r[t]" denotes the reference signal 208 which is to be filtered by the adapted prediction filter, "e[t]" denotes the error at time t, and "p[t]" denotes the predicted signal determined by applying a candidate set of prediction filter coefficients a[n] to the reference signal 208 during the adaptation process being performed to determine an adapted filter for time t.

During gradient descent adaptation of a prediction filter for echo cancellation, the partial derivatives (gradients) are usually warped in some way (for example, a gradient vector may be normalized to speed up convergence under some conditions) before being summed into the filter states. Gradient descent adaptation may be used to construct a time domain echo cancellation filter, but more typically operates in some transformed frequency domain representation where each sub-band effectively runs independently.

When subsystem 209 implements adaptation (e.g., gradient descent adaptation) to determine an adapted filter at time t, signal 212 of FIG. 2 may be a final predicted signal p[t] resulting from the final (adapted) filter determined in subsystem 209 by adaptation (assuming no correction of filter coefficients in subsystem 206 of FIG. 2). During the adaptation, signal 212 is a sequence of interim predicted signals p[t] which are employed in subsystem 209 to update sets of candidate filter coefficients (candidate values of the final, adapted filter coefficients), e.g., to compute gradient vectors during the adaptation.

We next describe a second class of embodiments in which an adapted filter is determined by adaptation (e.g., gradient descent adaptation), and compensation gain value(s) 213 is or are applied (e.g., in subsystem 209) during the adaptation process to at least one interim predicted signal p[t] generated using a set of candidate filter coefficients 214 (candidate values of the final, adapted filter coefficients). In the case of conventional gradient descent adaptation, the interim predicted signal p[t] is used to compute the gradient vector (during the adaptation process), and thus the corrected interim predicted signal (generated in accordance with embodiments of the invention) is instead used to compute the gradient vector. The heuristic (e.g., implemented by elements 201, 202, 203, 204, and 205) which is employed to determine each compensation gain value 213, uses a predicted signal (e.g., 212) and microphone signal (211) to compute gain value(s) 213. In the second class of embodiments, the gain value(s) 213 are applied (by element 206) to sets of filter coefficients 214 (to generate corrected filter coefficients 214A) and also to at least one interim predicted signal p[t] during the adaptation (to generate at least one corrected predicted echo signal), so as not to require re-evaluation of corrected candidate filter coefficients 214A (since the corrected predicted echo signal is used to compute the gradient vector during the adaptation process).

The optional implementation (indicated by the dashed line indicating provision of gain value(s) 213 to block 209) of FIG. 2 is an example embodiment in the second class of embodiments. In this implementation, the current (most recently generated) gain value(s) 213 is/are applied to correct an interim predicted signal p[t] generated during a gradient adaptation process (for the time t). The corrected interim predicted signal is used to update the current set of corrected candidate prediction filter coefficients 214A. The current gain value(s) 213 is/are also applied at element 206 (during the adaptation process) to each updated set of candidate prediction filter coefficients 214, and (after the adaptation has converged to determine a final set of adapted prediction filter coefficients for the time t) to the final adapted prediction filter coefficients 214.

Thus, example embodiments of the invention include one or both of the following steps:

1. application, at element 206 (as in the FIG. 2 system), of compensation gain(s) (e.g., gain(s) 213 provided to element 206 from subsystem 205) to prediction filter coefficients (e.g., coefficients 214 generated by subsystem 209), which may be candidate prediction filter coefficients a[t] determined during adaptation, or a final set of adapted prediction filter coefficients determined as a result of filter adaptation at time t; and optionally also 2. application during filter adaptation, at subsystem 209, of the compensation gain(s) 213 (determined by subsystem 205) to at least one interim predicted echo signal p[t] generated during adaptation (e.g., gradient adaptation), to generate a corrected interim predicted signal. In implementations which include step 2, subsystem 209 would use the corrected interim predicted signal in place of the uncorrected interim predicted echo signal p[t], thus improving the adaptation (e.g., reducing the required time for convergence).

Some example embodiments of the inventive method include the following steps, for each time-increment:

1) compute (e.g., in element 210 of FIG. 2) a predicted echo signal using the current filter estimate and a reference audio signal (e.g., this may be performed during adaptation using a current candidate set of filter coefficients, or after an adaptation process (for time t) using a final (adapted) set of filter coefficients); and 2) using the predicted echo signal and a microphone signal, determine (e.g., in elements 203 and 204) if there is any gain adjustment (by element 103 and/or 104) that appears to have occurred. If there is any corresponding filter adjustment to be made, at least one compensation gain (e.g., compensation gain(s) 213 determined in element 205) is applied (e.g., by element 206) to the current filter (e.g., to candidate filter coefficients being adapted in subsystem 209, or to final (adapted) filter coefficients) and optionally also (e.g., in subsystem 209 of FIG. 2 during adaptation) to an interim predicted echo signal p[t], to generate a corrected predicted echo signal.

In some such example embodiments, when the compensation gains are applied to candidate filter coefficients being adapted, the method also includes steps of:

3) using the predicted echo signal p[t] (or corrected predicted echo signal), the current filter coefficients (e.g., candidate filter coefficients determined in subsystem 209 during the adaptation process), and the microphone signal (211), compute (e.g., in subsystem 209) a gradient vector of the error function (i.e., a gradient vector for the current step of adaptation) over the filter;

4) optionally, make changes to the gradient vector to improve adaptation speed or convergence stability; and 5) apply the gradient vector (or a modified gradient vector determined in optional step 4) to the filter to generate an updated filter (e.g., an updated set of filter coefficients 214).

By tightly coupling the echo canceller with the level offset detection metric, it is possible to avoid the situation that gradient descent adaptation (for a time t) is completed (after a gain change at element 103 and/or 104) before level offset compensation gain(s) 213 (e.g., determined in element 205) can be applied to compensate for the gain change. If the level offset compensation gain(s) 213 were not applied until after completion of the adaptation (for the time t), the system might step (during adaptation) the filter states unnecessarily or in a way that would require correction after application of the level offset compensation gain(s).

With reference to FIG. 3, we next describe an example of the inventive method. FIG. 3 is a flowchart of an example process 300 of wideband adaptation of echo cancellation path changes. Process 300 can be performed by a system including one or more processors.

In step 310 of process 30, the system detects a wideband offset (e.g., due to a gain change at element 103 and/or 104 of FIG. 2). In step 320, the system adjusts (e.g., in element 206 of FIG. 2) an echo prediction filter (predictive filter) of an echo canceller based on the detecting. In step 330, the system removes (e.g., in element 207 of FIG. 2) a portion of an input signal (e.g., microphone signal 211 of FIG. 2) that is caused by (e.g., is indicative of echo content of) an output signal (e.g., the output of element 103 of FIG. 2, or sound emitted by speaker 101 of FIG. 2 in response to the output of element 103), based on the adjusted prediction filter.

In some implementations, the system computes the wideband offset based on a banding (e.g., in subsystem 201 of FIG. 2) of microphone levels and the predicted echo determined using the echo cancellation filter. In some implementations, the system computes the wideband offset based on a subset of the banding of microphone levels and the predicted echo. In some implementations, detection of the wideband offset (including computation of at least one offset value indicative of the wideband offset) is tightly coupled to operations of the echo canceller, e.g., so that filter adjustment (in response to occurrence of the wideband offset before or during an echo cancellation filter adaptation process) is applied before completion of a filter adaptation process (e.g., before performance of a gradient descent step of updating a set of filter coefficients) by the echo canceller.

Figure 4:
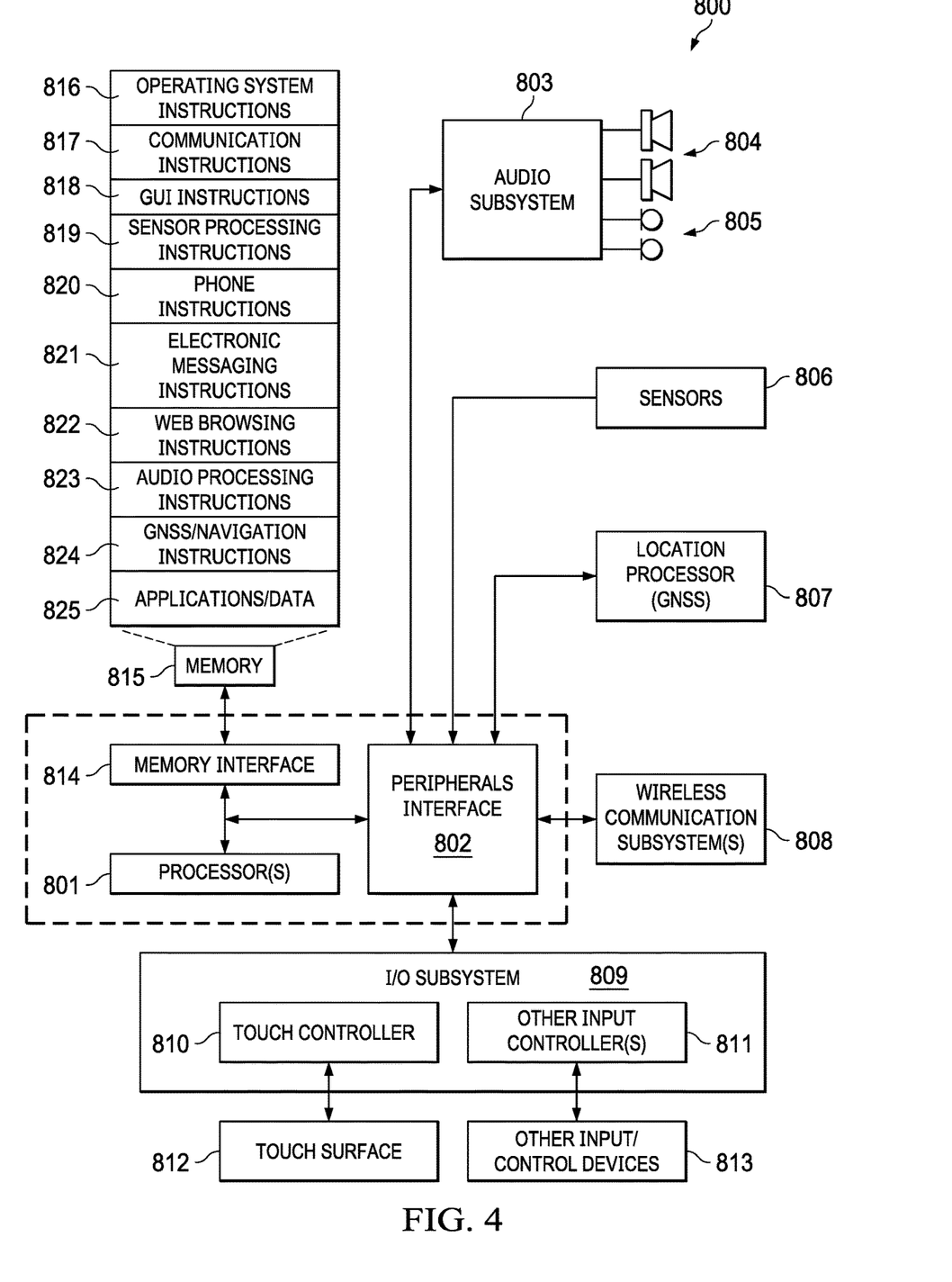
FIG. 4 is a mobile device architecture for implementing the features and processes described in reference to FIGS. 1-3, according to an embodiment

FIG. 4 is a mobile device architecture (800) for implementing the features and processes described herein (including with reference to FIGS. 1-3), according to an embodiment. A device having architecture 800 can be configured (e.g., processor(s) 801 and audio subsystem 803 of the architecture can be configured) to perform echo cancellation (or steps thereof) in accordance with an embodiment of the invention. Architecture 800 can be implemented in any electronic device, including but not limited to: a desktop computer, consumer audio/visual (AV) equipment, radio broadcast equipment, mobile devices (e.g., smartphone, tablet computer, laptop computer, wearable device). In the example embodiment shown, architecture 800 is for a smart phone and includes processor(s) 801, peripherals interface 802, audio subsystem 803, loudspeakers 804, microphone 805, sensors 806 (e.g., accelerometers, gyros, barometer, magnetometer, camera), location processor 807 (e.g., GNSS receiver), wireless communications subsystems 808 (e.g., Wi-Fi, Bluetooth, cellular) and I/O subsystem(s) 809, which includes touch controller 810 and other input controllers 811, touch surface 812 and other input/control devices 813. Other architectures with more or fewer components can also be used to implement the disclosed embodiments.

Memory interface 814 is coupled to processors 801, peripherals interface 802 and memory 815 (e.g., flash, RAM, ROM). Memory 815 stores computer program instructions and data, including but not limited to: operating system instructions 816, communication instructions 817, GUI instructions 818, sensor processing instructions 819, phone instructions 820, electronic messaging instructions 821, web browsing instructions 822, audio processing instructions 823, GNSS/navigation instructions 824 and applications/data 825. Audio processing instructions 823 include instructions for performing the audio processing described herein (including with reference to FIGS. 1-3).

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Aspects of some embodiments of the present invention may be appreciated from one or more of the following example embodiments ("EEE"s):

EEE1. An echo cancellation method performed on a reference signal indicative of audio content for playback by a speaker and an input signal from a microphone, contemporaneously with provision of an output signal to the speaker, the method including:
  receiving, by an echo canceller, the input signal;
  receiving, by the echo canceller, the reference signal, where the output signal has been generated by applying to the reference signal at least one level shift;
  predicting, using at least one prediction filter of the echo canceller, echo content of the input signal which would result from sound emission by the speaker in response to the reference signal, thereby determining predicted echo content of the input signal;
  in response to the input signal and the predicted echo content, detecting a wideband offset between the reference signal and the output signal;
  removing from the input signal at least some of the predicted echo content; and adapting the at least one prediction filter with generation of at least one adjusted prediction filter in response to the wideband offset.

EEE2. The method of EEE1, wherein the output signal has been generated such that the at least one level shift is unknown to the echo canceller, said method also including:
  generating at least one compensation gain in response to the wideband offset.

EEE3. The method of EEE2, including:
  during the adapting, applying the compensation gain to at least one candidate prediction filter, thereby generating the adjusted prediction filter.

EEE4. The method of EEE2, including:
  determining a sequence of values of the wideband offset; and
  during the adapting, applying the compensation gain to at least one candidate prediction filter thereby generating the adjusted prediction filter, in response to determining that at least one of the values of the wideband offset is below a threshold value.

EEE5. The method of any of EEE1-EEE4, wherein the adapting includes generating at least one interim predicted echo signal, and applying the compensation gain to the interim predicted echo signal in response to determining that at least one of the values of the wideband offset is below the threshold value, thereby generating at least one adjusted predicted echo signal.

EEE6. The method of any of EEE1-EEE5, wherein the adapting includes generating at least one interim predicted echo signal, and wherein said method includes:
  determining a sequence of values of the wideband offset; and
  during the adapting, applying the compensation gain to the interim predicted echo signal in response to determining that at least one of the values of the wideband offset is below a threshold value, thereby generating an adjusted predicted echo signal.

EEE7. The method of any of EEE1-EEE6, wherein the adapting includes performing gradient descent adaptation using the adjusted predicted echo signal.

EEE8. The method of EEE2, wherein said method includes:
  during the adapting, determining whether at least one frequency band of the input signal is in noise; and
  based on a result of said determining whether at least one frequency band of the input signal is in noise, applying the compensation gain to coefficients of at least one candidate prediction filter, thereby generating the adjusted prediction filter.

EEE9. The method of any of EEE1-EEE8, also including generating a predicted echo signal indicative of the predicted echo content, and wherein the input signal is a microphone signal, and the detecting of the wideband offset includes:
  banding the microphone signal, thereby generating a banded microphone signal;
  banding the predicted echo signal, thereby generating a banded predicted echo signal; and
  determining the wideband offset using the banded microphone signal and the banded predicted echo signal.

EEE10. A non-transitory computer-readable medium storing instructions that, when executed by at least one processor, cause the at least one processor to perform the method of any of EEE1-EEE9.

EEE11. A system configured to perform echo cancellation on a reference signal indicative of audio content for playback by a speaker and an input signal from a microphone, contemporaneously with provision of an output signal to the speaker, said system comprising:
  an echo cancellation subsystem, including at least one processor coupled and configured to receive the input signal and the reference signal, where the output signal has been generated by applying to said reference signal at least one level shift, and wherein the at least one processor is configured:
    to predict echo content of the input signal which would result from sound emission by the speaker in response to the reference signal, thereby determining predicted echo content of the input signal, including by adapting at least one prediction filter with generation of at least one adjusted prediction filter;
    to remove from the input signal at least some of the predicted echo content; and
    in response to the input signal and the predicted echo content, to detect a wideband offset between the reference signal and the output signal, where the generation of the at least one adjusted prediction filter is performed in response to the wideband offset.

EEE12. The system of EEE11, also including:
  a gain subsystem, coupled and configured to generate the output signal in response to the reference signal by applying to the reference signal the at least one level shift such that said at least one level shift is unknown to the echo cancellation subsystem.

EEE13. The system of EEE11, wherein the at least one processor is configured to generate at least one compensation gain in response to the wideband offset.

EEE14. The system of EEE13, wherein the at least one processor is configured to apply the compensation gain, during the adapting, to at least one candidate prediction filter, thereby generating the adjusted prediction filter.

EEE15. The system of any of EEE11-EEE14, wherein the at least one processor is configured to:
  determine a sequence of values of the wideband offset; and
  to apply the compensation gain, during the adapting, to at least one candidate prediction filter thereby generating the adjusted prediction filter, in response to determining that at least one of the values of the wideband offset is below a threshold value.

EEE16. The system of EEE13, wherein the adapting includes generating at least one interim predicted echo signal, and wherein the at least one processor is configured:
  to determine a sequence of values of the wideband offset; and
  to apply the compensation gain, during the adapting, to the interim predicted echo signal in response to determining that at least one of the values of the wideband offset is below a threshold value, thereby generating an adjusted predicted echo signal.

EEE17. The system of any of EEE11-EEE16, wherein the adapting includes performing gradient descent adaptation using the adjusted predicted echo signal.

EEE18. The system of any of EEE11-EEE17, wherein the at least one processor is configured:
  to determine, during the adapting, at least one frequency band of the input signal which is in noise; and
  to apply the compensation gain to coefficients of at least one candidate prediction filter, thereby generating the adjusted prediction filter, based on a result of determining whether the at least one frequency band of the input signal is in noise.

EEE19. The system of any of EEE11-EEE18, wherein the input signal is a microphone signal, and the at least one processor is configured:
  to generate a predicted echo signal indicative of the predicted echo content;
  to band the microphone signal, thereby generating a banded microphone signal;
  to band the predicted echo signal, thereby generating a banded predicted echo signal; and
  to determine the wideband offset using the banded microphone signal and the banded predicted echo signal.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An echo cancellation method performed on a reference signal indicative of audio content for playback by a speaker and an input signal from a microphone, contemporaneously with provision of an output signal to the speaker, the method including:
  receiving, by an echo canceller, the input signal;
  receiving, by the echo canceller, the reference signal, where the output signal has been generated by applying to the reference signal at least one level shift;
  predicting, using at least one prediction filter of the echo canceller, echo content of the input signal which would result from sound emission by the speaker in response to the reference signal, thereby determining predicted echo content of the input signal;
  in response to the input signal and the predicted echo content, detecting a wideband offset between the reference signal and the output signal;
  removing from the input signal at least some of the predicted echo content; and
  adapting the at least one prediction filter with generation of at least one adjusted prediction filter in response to the wideband offset.

2. The method of claim 1, wherein the output signal has been generated such that the at least one level shift is unknown to the echo canceller, said method also including:
  generating at least one compensation gain in response to the wideband offset.

3. The method of claim 2, including:
during the adapting, applying the compensation gain to at least one candidate prediction filter, thereby generating the adjusted prediction filter.

4. The method of claim 2, including:
determining a sequence of values of the wideband offset; and
during the adapting, applying the compensation gain to at least one candidate prediction filter thereby generating the adjusted prediction filter, in response to determining that at least one of the sequence of values of the wideband offset is below a threshold value.

5. The method of claim 1, wherein the adapting includes generating at least one interim predicted echo signal, and applying the compensation gain to the interim predicted echo signal in response to determining that at least one of the values of the wideband offset is below the threshold value, thereby generating at least one adjusted predicted echo signal.

6. The method of claim 1, wherein the adapting includes generating at least one interim predicted echo signal, and wherein said method includes:
determining a sequence of values of the wideband offset; and
during the adapting, applying the compensation gain to the interim predicted echo signal in response to determining that at least one of the values of the wideband offset is below a threshold value, thereby generating an adjusted predicted echo signal.

7. The method of claim 1, wherein the adapting includes performing gradient descent adaptation using the adjusted predicted echo signal.

8. The method of claim 2, wherein said method includes:
during the adapting, determining whether at least one frequency band of the input signal is in noise; and
based on a result of said determining whether at least one frequency band of the input signal is in noise, applying the compensation gain to coefficients of at least one candidate prediction filter, thereby generating the adjusted prediction filter.

9. The method of claim 1, also including generating a predicted echo signal indicative of the predicted echo content, and wherein the input signal is a microphone signal, and the detecting of the wideband offset includes:
banding the microphone signal, thereby generating a banded microphone signal;
banding the predicted echo signal, thereby generating a banded predicted echo signal; and
determining the wideband offset using the banded microphone signal and the banded predicted echo signal.

10. A non-transitory computer-readable medium storing instructions that, when executed by at least one processor, cause the at least one processor to perform the method of claim 1.

11. A system configured to perform echo cancellation on a reference signal indicative of audio content for playback by a speaker and an input signal from a microphone, contemporaneously with provision of an output signal to the speaker, said system comprising:
an echo cancellation subsystem, including at least one processor coupled and configured to receive the input signal and the reference signal, where the output signal has been generated by applying to said reference signal at least one level shift, and wherein the at least one processor is configured:
to predict echo content of the input signal which would result from sound emission by the speaker in response to the reference signal, thereby determining predicted echo content of the input signal, including by adapting at least one prediction filter with generation of at least one adjusted prediction filter;
to remove from the input signal at least some of the predicted echo content; and
in response to the input signal and the predicted echo content, to detect a wideband offset between the reference signal and the output signal, where the generation of the at least one adjusted prediction filter is performed in response to the wideband offset.

12. The system of claim 11, also including:
a gain subsystem, coupled and configured to generate the output signal in response to the reference signal by applying to the reference signal the at least one level shift such that said at least one level shift is unknown to the echo cancellation subsystem.

13. The system of claim 11, wherein the at least one processor is configured to generate at least one compensation gain in response to the wideband offset.

14. The system of claim 13, wherein the at least one processor is configured to apply the compensation gain, during the adapting, to at least one candidate prediction filter, thereby generating the adjusted prediction filter.

15. The system of claim 1, wherein the at least one processor is configured to:
determine a sequence of values of the wideband offset; and
to apply the compensation gain, during the adapting, to at least one candidate prediction filter thereby generating the adjusted prediction filter, in response to determining that at least one of the values of the wideband offset is below a threshold value.

16. The system of claim 13, wherein the adapting includes generating at least one interim predicted echo signal, and wherein the at least one processor is configured:
to determine a sequence of values of the wideband offset; and
to apply the compensation gain, during the adapting, to the interim predicted echo signal in response to determining that at least one of the values of the wideband offset is below a threshold value, thereby generating an adjusted predicted echo signal.

17. The system of claim 1, wherein the adapting includes performing gradient descent adaptation using the adjusted predicted echo signal.

18. The system of claim 1, wherein the at least one processor is configured:
to determine, during the adapting, at least one frequency band of the input signal which is in noise; and
to apply the compensation gain to coefficients of at least one candidate prediction filter, thereby generating the adjusted prediction filter, based on a result of determining whether the at least one frequency band of the input signal is in noise.

19. The system of claim 1, wherein the input signal is a microphone signal, and the at least one processor is configured:
to generate a predicted echo signal indicative of the predicted echo content;
to band the microphone signal, thereby generating a banded microphone signal;
to band the predicted echo signal, thereby generating a banded predicted echo signal; and to determine the wideband offset using the banded microphone signal and the banded predicted echo signal.

\* \* \* \* \*